United States Patent
Pihlaja (10) Patent No.: US 8,659,555 B2
(45) Date of Patent: Feb. 25, 2014

(54) METHOD AND APPARATUS FOR EXECUTING A FEATURE USING A TACTILE CUE

(75) Inventor: Pekka Juhana Pihlaja, Hevonpää (FI)

(73) Assignee: Nokia Corporation, Espoo (FI)

( * ) Notice: Subject to any disclaimer, the term of this patent is extended or adjusted under 35 U.S.C. 154(b) by 837 days.

(21) Appl. No.: 12/145,183

(22) Filed: Jun. 24, 2008

(65) Prior Publication Data
US 2009/0315836 A1 Dec. 24, 2009

(51) Int. Cl.
*G06F 3/041* (2006.01)

(52) U.S. Cl.
USPC ............ 345/173; 345/156; 715/702; 715/863

(58) Field of Classification Search
USPC .......... 345/156, 173, 157, 168, 169; 715/702, 715/863, 864; 178/18.01, 18.03
See application file for complete search history.

(56) References Cited

U.S. PATENT DOCUMENTS

| | | | |
|---|---|---|---|
| 4,202,615 A | 5/1980 | Nemoto | 354/152 |
| 4,314,750 A | 2/1982 | Orban | 354/198 |
| 4,327,985 A | 5/1982 | Urushihara et al. | 354/289 |
| 5,496,174 A | 3/1996 | Garner | 434/114 |
| 5,748,185 A * | 5/1998 | Stephan et al. | 345/173 |
| 5,926,119 A | 7/1999 | Lindeman et al. | 341/22 |
| 6,218,966 B1 | 4/2001 | Goodwin et al. | 341/27 |
| 6,433,801 B1 * | 8/2002 | Moon et al. | 715/840 |
| 6,535,201 B1 | 3/2003 | Cooper et al. | 345/173 |
| 6,561,600 B1 * | 5/2003 | Seeley et al. | 312/257.1 |
| 6,636,202 B2 | 10/2003 | Ishmael et al. | 345/173 |
| 6,667,697 B2 | 12/2003 | Botich | 341/22 |
| 6,667,738 B2 | 12/2003 | Murphy | |
| 6,788,294 B2 | 9/2004 | Takala et al. | |
| 6,967,642 B2 | 11/2005 | SanGiovanni | |
| 7,009,599 B2 | 3/2006 | Pihlaja | |
| 7,941,786 B2 | 5/2011 | Scott et al. | 717/121 |
| 2001/0040558 A1 | 11/2001 | Takala et al. | |
| 2002/0003469 A1 | 1/2002 | Gupta | 340/407.1 |
| 2002/0158836 A1 | 10/2002 | Ishmael, Jr. et al. | 345/156 |
| 2003/0022701 A1 | 1/2003 | Gupta | 455/566 |
| 2003/0153349 A1 | 8/2003 | Sun | 455/550 |
| 2004/0056877 A1 | 3/2004 | Nakajima | 345/702 |
| 2004/0121760 A1 | 6/2004 | Westman et al. | 455/411 |
| 2004/0169598 A1 | 9/2004 | Arling et al. | 341/173 |

(Continued)

FOREIGN PATENT DOCUMENTS

| | | |
|---|---|---|
| DE | 43 19 795 A1 | 1/1994 |
| EP | 1 098 241 A2 | 3/2000 |

(Continued)

OTHER PUBLICATIONS

HTC Smart Mobility, Touch Phone User Manual, www.htc.com., 135 pgs.

(Continued)

*Primary Examiner* — Koosha Sharifi-Tafreshi
(74) *Attorney, Agent, or Firm* — Harrington & Smith (57) ABSTRACT

In accordance with an example embodiment of the present invention, an electronic device is configured to provide a tactile cue associated with a feature. The electronic device is also configured to identify one or more user actuations. After identifying one or more user actuations, the electronic device is configured to execute the feature.

27 Claims, 7 Drawing Sheets

(56) References Cited

U.S. PATENT DOCUMENTS

| | | | |
|---|---|---|---|
| 2005/0099403 A1* | 5/2005 | Kraus et al. | 345/173 |
| 2005/0122313 A1 | 6/2005 | Ashby | 345/168 |
| 2005/0184959 A1* | 8/2005 | Kompe et al. | 345/163 |
| 2006/0017711 A1 | 1/2006 | Pihlaja | |
| 2006/0046031 A1* | 3/2006 | Janevski | 428/195.1 |
| 2006/0098397 A1 | 5/2006 | Chou | 361/680 |
| 2006/0181515 A1* | 8/2006 | Fletcher et al. | 345/173 |
| 2006/0202803 A1 | 9/2006 | Yoon et al. | 340/10.4 |
| 2006/0256090 A1 | 11/2006 | Huppi | 345/173 |
| 2007/0035523 A1* | 2/2007 | Cohen | 345/169 |
| 2007/0132735 A1* | 6/2007 | Gil-Gomez | 345/170 |
| 2007/0152974 A1 | 7/2007 | Kim et al. | 345/168 |
| 2007/0157089 A1* | 7/2007 | Van Os et al. | 715/702 |
| 2007/0270179 A1 | 11/2007 | Lee et al. | 455/550.1 |
| 2007/0277124 A1* | 11/2007 | Shin et al. | 715/863 |
| 2008/0010593 A1 | 1/2008 | Uusitalo et al. | 715/702 |
| 2008/0040692 A1 | 2/2008 | Sunday et al. | 715/863 |
| 2008/0042978 A1 | 2/2008 | Perez-Noguera | 345/168 |
| 2008/0055273 A1* | 3/2008 | Forstall | 345/173 |
| 2008/0084400 A1 | 4/2008 | Rosenberg | 345/173 |
| 2008/0204418 A1* | 8/2008 | Cybart et al. | 345/173 |
| 2008/0234849 A1* | 9/2008 | Han | 700/94 |
| 2008/0244447 A1* | 10/2008 | Sagar | 715/810 |
| 2009/0002328 A1* | 1/2009 | Ullrich et al. | 345/173 |
| 2009/0019396 A1 | 1/2009 | McCarthy | 715/827 |
| 2009/0251420 A1* | 10/2009 | Do et al. | 345/173 |
| 2009/0319893 A1 | 12/2009 | Pihlaja | 715/702 |
| 2011/0047459 A1* | 2/2011 | Van Der Westhuizen | 715/702 |

FOREIGN PATENT DOCUMENTS

| | | |
|---|---|---|
| EP | 1280319 A2 | 1/2003 |
| GB | 2 306 078 | 4/1997 |
| GB | 2 445 445 A | 7/2008 |
| JP | 2004-117950 | 4/2004 |
| JP | 2002-024903 | 1/2005 |
| JP | 2005-223616 | 8/2005 |
| JP | 2006-003746 | 1/2006 |
| KR | 2003-0048697 | 6/2003 |
| KR | 2006-0027655 | 3/2007 |
| WO | WO-98/00775 A1 | 1/1998 |
| WO | WO-2004/042685 | 5/2004 |
| WO | WO-2004/068521 | 8/2004 |
| WO | WO-2006009813 A1 | 1/2006 |
| WO | 2007/036596 A1 | 4/2007 |
| WO | WO-2008/004049 A3 | 1/2008 |
| WO | Wo-2009/156810 A1 | 12/2009 |

OTHER PUBLICATIONS

HTC Touch, Navigating the Touch Cube, http://www.htc.com/uploadedFiles/Common/Training_Guides/HTC_Touch/e-Learning/htctouch.htm, 1pg.

* cited by examiner

METHOD AND APPARATUS FOR EXECUTING A FEATURE USING A TACTILE CUE

RELATED APPLICATIONS

This application relates to U.S. Application No. 2008/0010593, titled "USER INTERFACE INPUT DEVICE", filed Jun. 30, 2006, now U.S. Pat. No. 7,916,002 B2, which is hereby incorporated by reference in its entirety and U.S. Patent Application 2009/0319893, titled "METHOD AND APPARATUS FOR ASSIGNING A TACTILE CUE", concurrently filed, now abandoned, which is hereby incorporated by reference in its entirety.

TECHNICAL FIELD

The present application relates generally to electronic device user interfaces.

BACKGROUND

User interfaces, such as touchscreens have become commonplace since the emergence of the electronic touch interface. Touchscreens have become familiar in retail settings, on point of sale systems, on smart phones, on Automated Teller Machines (ATMs) and on Personal Digital Assistant (PDAs). The popularity of smart phones, PDAs, and many types of information appliances is growing the demand for, and the acceptance of, touchscreens. Although the demand and acceptance of touchscreens is growing, touchscreens are still limited.

SUMMARY

Various aspects of the invention are set out in the claims.

In accordance with an example embodiment of the present invention, an electronic device is configured to provide a tactile cue associated with a feature. The electronic device is also configured to identify one or more user actuations. After identifying one or more user actuations, the electronic device is configured to execute the feature.

BRIEF DESCRIPTION OF THE DRAWINGS

For a more complete understanding of example embodiments of the present invention reference is now made to the following descriptions taken in connection with the accompanying drawings in which.

DETAILED DESCRIPTION OF THE DRAWINGS

An example embodiment of the present invention and its potential advantages are best understood by referring to FIGS. 1A through 6 of the drawings.

Traditional screens, such as a touchscreen, provide a user with soft keys and other soft input devices on a user interface. But soft keys and soft input devices are of limited use. In particular, the soft keys and soft input devices do not provide users with tactile cues of use without visual inspection, e.g., eyes-free use. Using a touchscreen without visual inspection is desirable for features, such as music playback, volume control, Global Positioning System (GPS) navigation and/or the like. Example embodiments of the invention use tactile cues to facilitate execution of a feature on a touchscreen, display cover, or electronic device.

Figure 1A:
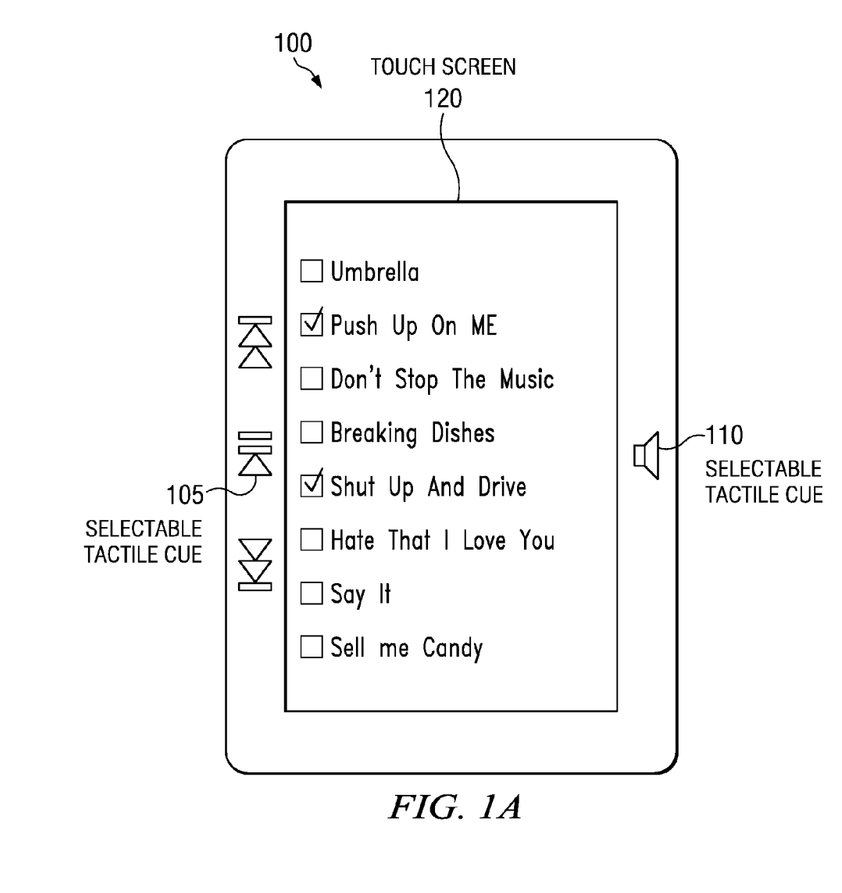
FIG. 1A is a block diagram depicting an example electronic device having selectable tactile cues according to an example embodiment of the invention.

FIG. 1A is a block diagram depicting an example electronic device 100 having selectable tactile cues according to an example embodiment of the invention. The electronic device 100, e.g., a mobile device, is configured to communicate in a wireless network. The wireless network may be a Wireless Personal Area Network (WPAN) operating, for example, under the Bluetooth or IEEE 802.15 network protocol. The wireless network may also be a Wireless Local Area Network (WLAN) operating, for example under the IEEE 802.11, Hiperlan, WiMedia Ultra Wide Band (UWB), WiMax, WiFi, Digital Enhanced Cordless Telecommunications (DECT) and/or similar network protocols. The wireless network may be a wireless wide area network (WWAN) operating, for example, under a cellular telephone network protocol, for example Global System for Mobile (GSM), General Packet Radio Service (GPRS), Enhanced Data rates for GSM Evolution (EDGE), Code Division Multiple Access (CDMA), Universal Mobile Telecommunications System (UMTS), CDMA2000, and/or the like. It is possible for each of these wireless network protocols to be capable to communicate with the electronic device 100. These wireless network protocols are not meant to be limiting, since it is common for wireless communications protocols to provide for communication between mobile wireless devices and/or on a wired network infrastructure via wireless access points.

In this example embodiment, the electronic device 100 comprises a touchscreen 120 having at least one selectable tactile cue, for example selectable tactile cues 105, 110. A user may associate a selectable tactile cue 105 with a particular feature, e.g., playing music. To employ the example embodiment, the user places a finger on the selectable tactile cue 105. As a result, the user receives a tactile sensation from the selectable tactile cue 105. The tactile sensation may indicate an association between the feature and the selectable tactile cue. For example, the user places a finger on selectable tactile cue 105 and associates the selectable tactile cue 105, e.g., a playback button, as a music playback feature. If the user would like to execute the feature, the user presses the selectable tactile cue 105 (or provides some other interface indication) and the electronic device 100 executes the feature associated with the selected tactile cue.

It should be understood that the above is merely an example of a selectable tactile cue 105 and any number of features may be employed using, for example, selectable tactile cue 110 or the like. In an example embodiment, the tactile cue may be arranged in a pattern of a predetermined number of raised lines. In an alternative embodiment, the tactile cue may use a shape, other identifiable symbol and/or the like. Thus, the tactile cue distinguishes from another by the pattern of raised lines, the shape, identifiable symbol, and/or the like. In an alternative embodiment, the tactile cues may be an indicator of a starting location or point on a screen to facilitate execution of a feature using a finger sweep, roll, gesture, and/or the like. In an embodiment, a sweep may move or carry a finger on the touchscreen 120. In an embodiment, a roll may move by turning on an axis on touchscreen 120. In an embodiment, a gesture may make a sign or motion, such as an "x." It should be understood that the above is merely an example and sweep, roll, and gesture may comprise many different forms and variations as known in the art.

It should also be understood that while an electronic device 100 is shown in the drawings and will be used in describing example embodiments of the invention, the invention has application to the entire gamut of consumer electronics including, but not limited to, a mobile telephone, a personal digital assistant, a portable computer device, GPS, a mobile computer, a camera, a browsing device, an electronic book reader, a combination thereof, and/or the like. Further still, example embodiments of the invention may also be applicable to a touchscreen, a screen, a screen edge, a display cover, a touch pad, or a combination thereof.

Figure 1B:
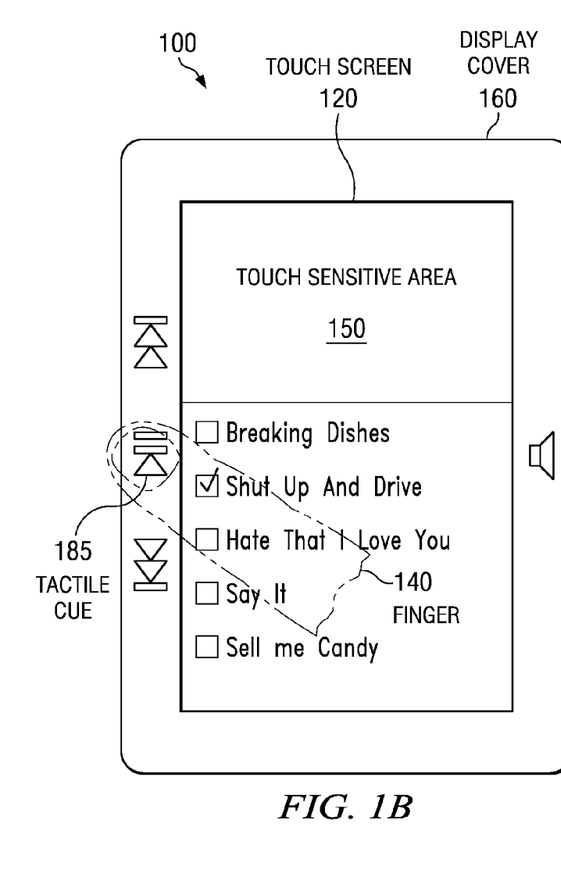
FIG. 1B is a block diagram depicting one or more user actuations of a tactile cue on an electronic device operating in accordance with an example embodiment of the invention.

FIG. 1B is a block diagram depicting one or more user actuations of a tactile cue 185 on electronic device 100 operating in accordance with an example embodiment of the invention. More specifically, FIG. 1B shows an electronic device 100 comprising a touchscreen 120, a touch sensitive area 150, and a tactile cue 185. In use, the tactile cue 185 is configured to facilitate execution of a feature. For example, a user may locate and actuate a Play/Pause feature button having a tactile cue, such as tactile cue 185, by moving a finger 140 onto a display cover 160 of the touchscreen 120. To identify one or more user actuations, the touch sensitive area 150 is configured to identify one or more user actuations of the tactile cue. For example, the touch sensitive area 150 identifies a user pressing or otherwise activating a playback feature. The touch sensitive area 150 is also configured to execute the feature. That is, the touch sensitive area 150 executes the Play/Pause feature. In an embodiment, the touch sensitive area 150 is further configured to modify a parameter of a feature. For example, the touch sensitive area 150 modifies a parameter, such as a volume level, of a volume control feature. Thus, the touch sensitive area 150 may execute a feature and modify a parameter of a feature.

It should be understood that it is also possible to select a tactile cue using a sweep, roll, gesture, and/or the like as described below. In the case of a sweep, roll, gesture, and/or the like the touch sensitive area 150 is further configured to detect a sweep, roll, or gesture or detect multiple sweep motions in sequence. It should also be understood that the touch screen area 150 may be a portion of touchscreen 120, the entire touchscreen 120, or a combination thereof. In an embodiment, a piezo actuator as described below may also be employed.

It should be further understood that the tactile cue 185 may be positioned on a touchscreen, on a screen, on a screen edge, on a display cover, adjacent to a screen, or a combination thereof. It should be further understood that the tactile cue 185 may be concave, convex, embossed icon, a replaceable sticker, flat with a textured material, three dimensional and/or the like. In an embodiment, the tactile cue 185 may be opaque, transparent, and/or the like.

Moreover, in an example embodiment, the touch sensitive area 150 may use one of many touch sensor technologies. For example, the touch sensitive area 150 may use a capacitive touch sensor, e.g., an analog capacitive sensor or a projected capacitive sensor, a resistive touch sensor, an optical touch sensor, an acoustic touch sensor, a force sensor, a vibration touch sensor, or any other suitable touch sensor. Use of other touch sensor technologies is also possible. Several of these technologies are described briefly below.

A capacitive touch sensor comprises at least one conductive layer. The conductive layer is usually energized by an oscillator circuit. When a user touches the tactile cue 185, a signal is generated as a result of a capacitive coupling between the user and the conductive layer. The signal is converted to the location of the touch by a sensing circuit.

A resistive touch sensor typically comprises two transparent conductive layers separated by spacer dots. When a touch forces the two conductive layers to come into contact, the resulting voltage is sensed and the location of the touch is computed. It should be understood that the touch sensitive area 150 may also use these sensors for detecting sweeps, rolls, or gestures.

Figure 2:
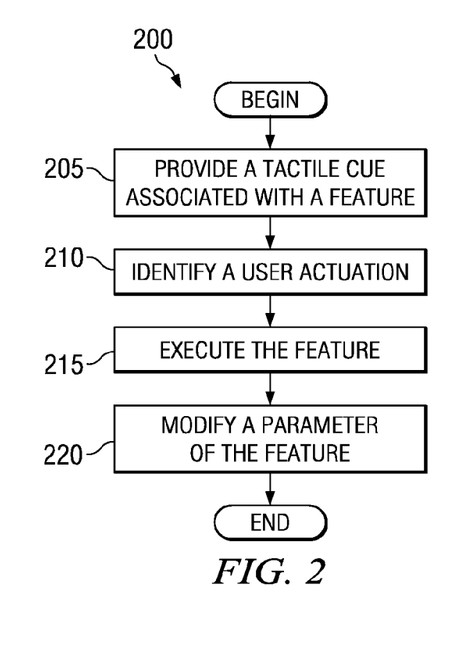
FIG. 2 is a flow diagram illustrating an example method for executing a feature according to an example embodiment of the invention.

FIG. 2 is a flow diagram illustrating an example method for executing a feature according to an example embodiment of the invention. Example process 200 may be performed by an electronic device, for example electronic device 100 of FIG. 1A. The electronic device provides a tactile cue associated with a feature at 205. For example, electronic device provides a user with a tactile cue associated for volume control. In an embodiment, the electronic device may provide a tactile cue that is selectable. In an embodiment, the electronic device may provide a tactile cue by positioning the tactile cue on a touchscreen, on a screen, a screen edge, on a display cover, or a combination thereof.

In an embodiment, the electronic device may include a replaceable cover. The replaceable cover may be stenciled, embossed, or silk screened as desired with any number of tactile cues or embossed logos. For example, the tactile cues may resemble normal mechanical keys with key graphics. The tactile cues may also be concave instead of convex. Further, the tactile cues may use different materials, e.g. rubber or leather patches on a plastic or a metal cover. In an example embodiment, the tactile cues may also be dynamic (e.g., tactile cues appear and disappear) using an actuator, such as a mechanical actuator.

Referring by now to the example process 200, the electronic device may identify one or more user actuations at 210. For example, the electronic device identifies that a user actuates a feature, such as increasing volume. Restated, the electronic device identifies the user has selected the tactile cue or provided some other indication of selection (e.g., sweep, roll, gesture, and/or the like) at 210. In an embodiment, the electronic device may also detect multiple user actuations, such as sweep motions in sequence. At 215, the electronic device executes the feature. For example, the electronic device, after identifying the sweep (e.g., a user actuation), executes the volume control feature.

In an embodiment, the electronic device may also modify a parameter of a feature at 220. For example, the electronic device modifies a parameter, such as a volume level, of the volume control feature. Thus, the electronic device, using example process 200 may execute a feature and modify a parameter of a feature. It should be understood that the electronic device can identify a user interaction, such as a sweep, roll, gesture, button press, and/or the like.

FIGS. 3A-3D show various techniques for using tactile cues as a starting point to facilitate execution of one or more features according to example embodiments of the invention. It should be understood that the description of FIGS. 3A-3D are described in view of an electronic device, but a component, such as the touch sensitive area 150 of FIG. 1B may also be employed.

Figure 3A:
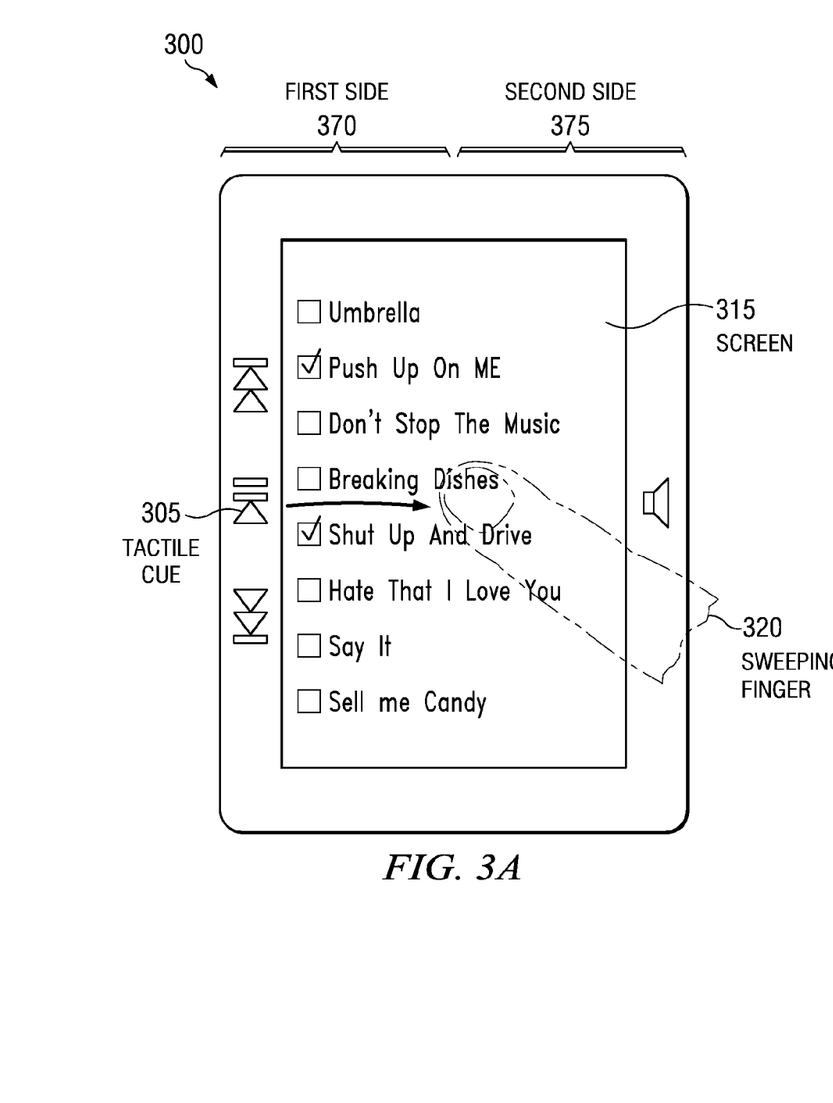
FIG. 3A is a block diagram depicting a user's sweeping finger moving on a screen to facilitate execution of a feature on an electronic device according to an example embodiment of the invention.

FIG. 3A is a block diagram depicting a user's sweeping finger 320 moving on a screen 315 to facilitate execution of a feature (e.g., a PLAY function) on an electronic device 300 according to an example embodiment of the invention. In this example embodiment, the electronic device 300 is configured to detect the user's sweeping finger 320. The user's sweeping finger begins at the tactile cue 305 and moves from a first side 370 of a screen 315 towards a second side 375 of the screen 315. Based at least in part on the starting point (e.g., the tactile cue 305) and the sweeping motion of the sweeping finger 320, the electronic device 300 is configured to use a touch sensitive area, such as the touch sensitive area 150 of FIG. 1B or a piezo actuator to execute the play feature. The electronic device 300 may use a piezo actuator, which comprises a piezo element to generate an electrical signal in response to physical pressure (e.g., haptic feedback), such as the force exerted by the user's sweeping finger 320, to detect user input. Based at least in part on the physical pressure, the piezo actuator identifies a particular actuation using a start and end point (e.g., an x-coordinate/y-coordinate) of the user's sweeping finger 320. In turn, the piezo actuator is configured to associate one or more user actuations with a feature for the electronic device 300. In other words, the piezo actuator associates a sweep beginning at the tactile cue 305 and moving towards the second side 375 of the screen 315 as a playback feature.

Moreover, the piezo actuator may also use a similar piezo element to provide tactile feedback, such as vibration, to a user of the electronic device 300. Thus, providing a user with a confirmation of a successful feature activation.

It should be understood that both the piezo sensors and the piezo actuator may be fabricated from a single piezo-electric element so as to be both coplanar and electronically isolated from one another. The difference in operation between the piezo sensors and the piezo actuator is achieved through a coupling of the piezo sensors and the piezo actuator to a voltage source and a differential voltage measurement device respectively as known in the art. Other configurations are also possible.

It should be further understood that any number of sweeping variations may be employed by a user. The user's sweeping finger 320 from a first side 370 towards a second side 375 is merely for illustrative purposes. That is, a user's sweeping finger 320 may also move from the bottom of the screen 315 upwards towards the top of the screen 315, diagonally across the screen 315, and/or a combination thereof. Other variations are also possible.

Figure 3B:
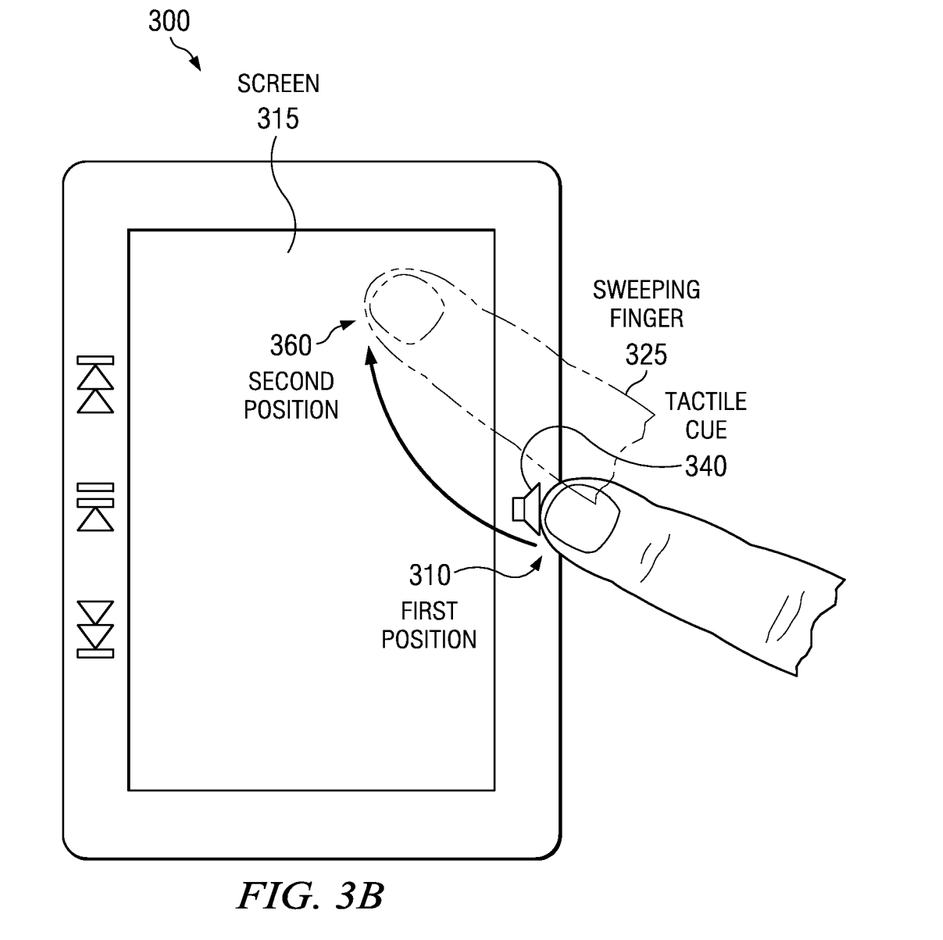
FIG. 3B is a block diagram depicting a user's sweeping finger moving upwards on a screen to facilitate execution of a feature on an electronic device according to an example embodiment of the invention.

FIG. 3B is a block diagram depicting a user's sweeping finger 325 moving upwards on a screen 315 to execute a feature, e.g., change volume, on an electronic device 300 according to an example embodiment of the invention. In the example embodiment, the electronic device 300 is configured to detect or identify the user's sweeping finger 325 or user actuation. For example, the user's sweeping finger 325 moves from a first position 310, e.g., located approximately at a tactile cue 340, towards a second position 360. For example, the user's sweeping finger 325 moves from a volume control representation, e.g., tactile cue 340, at the first position 310 upwards towards the second position 360. The electronic device 300 may use a piezo actuator, as described above, to process the movement or user actuation, associate the movement or user actuation with volume control, and modify or execute the volume control feature on the electronic device 300. At no point does the user need to look at the electronic device 300, but rather the user may use the tactile cue 340 to facilitate execution of the feature (via a finger touch or sweep). It should be understood the user may also decrease the electronic device 300 volume by sweeping in a downward manner or execute other like features.

It should be further understood that the user may adjust the volume or other electronic device 300 features by sweeping in a known direction and the upward/downward sweeping is merely for illustrative purposes. For example, the same sweeping motion for volume control may also be used to allow the user to adjust the screen 315 by zooming in or out. Many other feature configurations are also possible. It should be further understood that the user is not limited to moving in a sweeping motion. But rather, the user may also make a gesture, such as the letter "X" to indicate closing a program or window. Other variations are also possible.

Figure 3C:
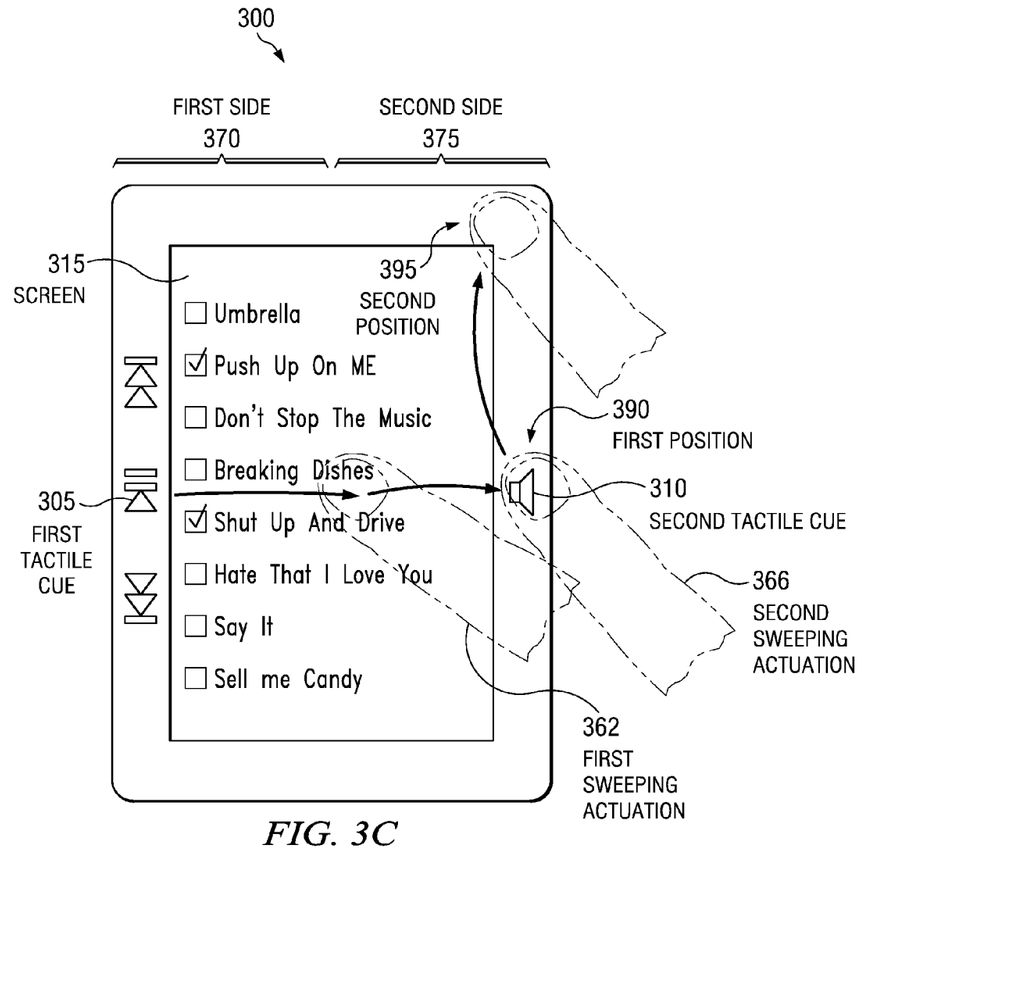
FIG. 3C is a block diagram depicting a user's sweeping finger moving multiple times on a screen to facilitate execution of multiple features on an electronic device according to an example embodiment of the invention.

FIG. 3C is a block diagram depicting a user sweeping multiple times on a screen 315 to facilitate execution of multiple features (e.g., a PLAY and volume) on the electronic device 300 according to an example embodiment of the invention. In this example embodiment, the electronic device 300 detects or otherwise identifies a first sweeping actuation 362. The first sweeping action, for example, begins at first tactile cue 305 and moves from a first side 370 of the screen 315 towards a second side 375 of the screen 315 ending at a second tactile cue 310. As explained in FIG. 3A, the electronic device 300 identifies and executes the play feature based at least in part on the starting point (e.g., the first tactile cue 305) and the sweeping motion of the first sweeping actuation 362. Since the first sweeping actuation 362 may end at the second tactile cue 310, it is possible for the electronic device 300 to detect a second actuation or sweeping motion in sequence, using a second sweeping actuation 366. For example, the electronic device 300 detects the second sweeping actuation 366 moving from the volume control (e.g., the second tactile cue 310) at a first position 390 upwards towards a second position 395. Thus, the electronic device 300 identifies the second sweeping motion with volume control and executes the volume control to adjust the volume for the now playing music. Stated differently, the user selects multiple features in sequence.

One benefit of selecting multiple features is that some features are typically executed in sequence, such as playback of a song and adjusting the volume. It should be understood that two sweeping motions or actuations may be performed in any number of directions or variations. Further, the sweeping motions or actuations may be performed by a single finger or multiple fingers.

Figure 3D:
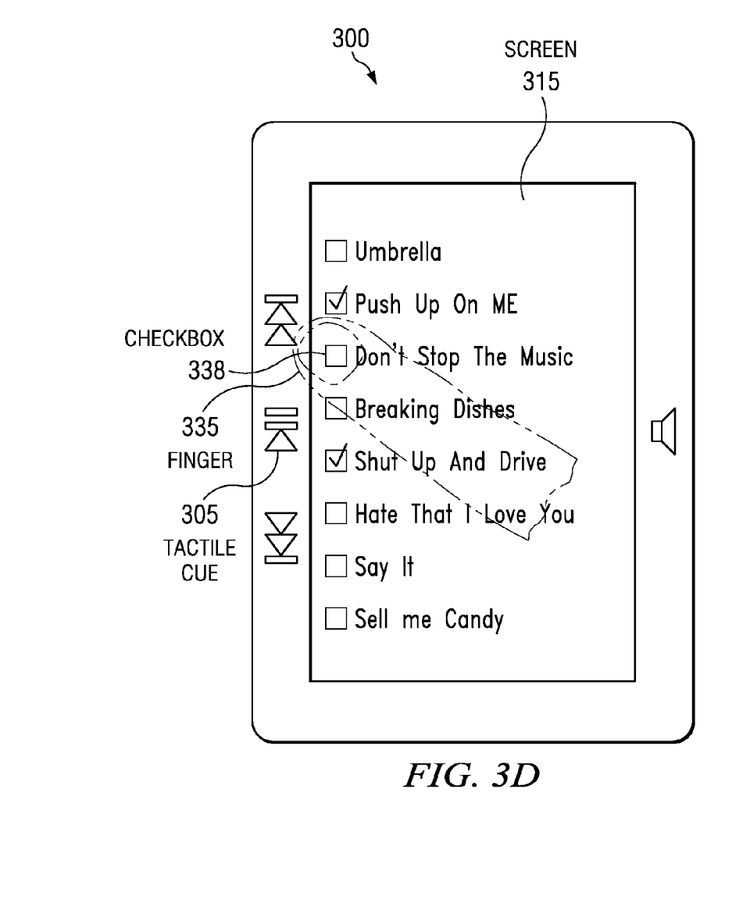
FIG. 3D is a block diagram depicting selecting a checkbox on a screen according to an example embodiment of the invention.

FIG. 3D is a block diagram representing selecting a checkbox 338 on screen 315 according to an example embodiment of the invention. In this example embodiment, screen 315 of the electronic device 300 comprises tactile cue 305, and a checkbox 338. The electronic device 300 identifies a user moving a finger 335, beginning at tactile cue 305, on the screen 315 towards the checkbox 338. In an embodiment, the checkbox 338 may be positioned at an edge of the screen 315 (e.g., approximately 2 millimeters from the screen 315 edge). For example, the electronic device 300 detects the user moving the finger 335 or other actuating towards the edge of the screen 315 and locates the checkbox 338. The user locates the checkbox 338 at least in part by using the tactile cue 305 location. After locating the checkbox 338, a user touches the checkbox 338 to check or otherwise activate the checkbox 338. By selecting the checkbox 338, a particular feature or configuration is applied by the electronic device 300. For example, the user selects the checkbox 338, representing the song "Don't stop the music." In turn, the electronic device 300 executes the feature, e.g., plays the song.

It is useful to note that one benefit of using the checkbox 338 on the edge of the screen 315 is so that the checkbox 338 is not confused with sweeping, rolling, gestures, and/or the like for activating other features. It should be understood that the checkbox 338 is just one example and other features, such as a Graphical User Interface menu or drop down menus, may also be employed.

Figure 4:
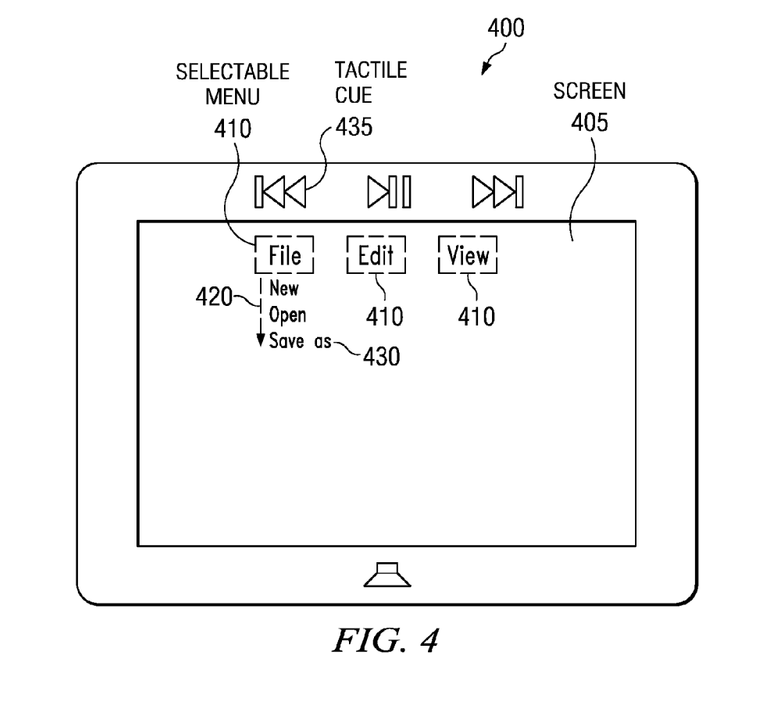
FIG. 4 is a block diagram depicting an electronic device having a selectable menu according to an example embodiment of the invention.

FIG. 4 is a block diagram depicting an electronic device 400 having a selectable menu 410 according to an example embodiment of the invention. As shown in FIG. 4, the selectable menu 410 may include a Graphical User Interface menu with basic menu commands, such as file, edit, or view. The basic menu commands may also include sub menus, such as a setup menu or image menu for adjusting brightness and contrast. The user, using at least in part a tactile cue 435 to locate the edge of the screen 405. After locating the edge of the screen 405, the user moves a finger towards to the selectable menu 410, e.g., approximately 2 millimeters to select a feature. For example, the user sweeps to the "Save as" command 430 starting from the edge of the screen 405. The electronic device 400 is configured to execute the feature, e.g., a "Save as" command 430. That is, the user selects a menu associated with a particular feature or configuration, which in turn is executed by the electronic device 300 by at least in part using the tactile cue 435 as a starting point.

It should be understood that the selectable menu 410 may be located adjacent to the screen 405, e.g., approximately 2 millimeters, from the edge of the screen 405. Thus, electronic device 400 may distinguish the selection of the selectable menu 410 from a user sweeping from the tactile cue 435 on the cover based at least in part by the starting point (e.g., 2 millimeters from the edge). It should be further understood that the tactile cue 435 may be concave, convex, embossed icon, a replaceable sticker, flat with a textured material, three dimensional and/or the like. In an embodiment, the tactile cue 435 may be opaque, transparent, and/or the like.

It should further be understood that since the sweep begins, e.g., approximately 2 millimeters, from the edge of the screen 405, example embodiments of the invention may distinguish this sweep from a sweep intended to playback as shown in FIG. 3A. For example, the sweep may begin more than 2 millimeters from the edge of the screen 405.

Since example embodiments may be employed eyes-free, accidental activation of a graphical user interface is possible. In an example embodiment of the invention, a menu lock mode is used. In the menu lock mode, an electronic device is configured to allow sweeps starting from the edge of the touchscreen, for example, during screen 405 sweeps. That is, this example embodiment locks features not associated with the tactile cue on a screen edge when the sweep begins. It should be further understood that features in the vicinity of the tactile cue are lock. In an embodiment, all features not associated with the tactile cue are locked.

In an embodiment, a touch sensitive area, such as touch sensitive area 150 of FIG. 1B, is further configured to lock features not associated with the tactile cue. For example, in response to recognizing that a user is trying to perform associated with a tactile cue. A user, for example, may sweep from a tactile cue for playback. If the user sweeps from the playback tactile cue, e.g., not the edge of the screen 405, the electronic device 400 identifies that the menu is not associated with the sweep and locks the selectable menu 410. Menu locking may be performed using a touch sensitive area, piezo actuator or other technique known in the art. It should be further understood that the electronic device 400 may be configured in various variations for providing input using any variation and/or combination of tactile cues.

Figure 5:
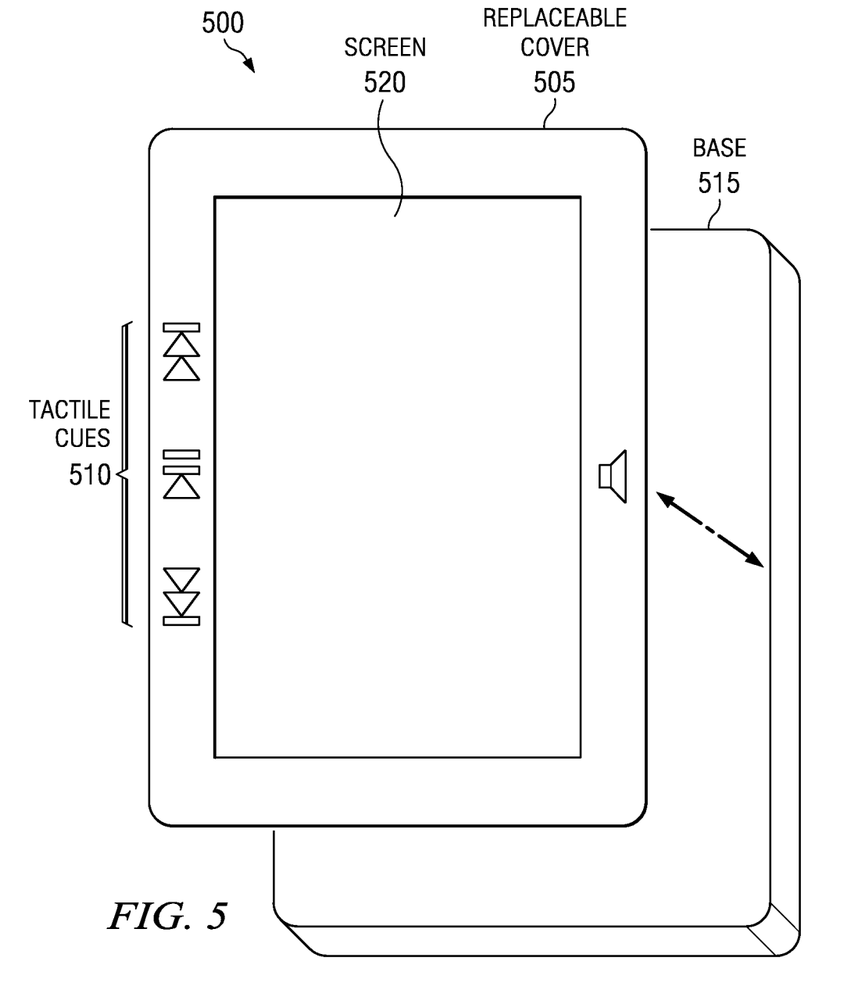
FIG. 5 is a block diagram depicting an electronic device comprising a replaceable cover according to an example embodiment of the invention.

FIG. 5 is a block diagram depicting an electronic device 500 comprising a replaceable cover 505 according to an example embodiment of the invention. The electronic device 500 comprises a screen 520, a base 515, and a replaceable cover 505 having tactile cues 510. In an example embodiment, the replaceable cover 505 of the electronic device 500 is coupled or otherwise affixed to the screen 520 thereby providing tactile cues 510 to a user. The tactile cues 510 may be comprised of many types of materials. Some examples include using at least one of the following materials: rubber, leather, plastic, metal, or a combination thereof.

In use, a display cover of the electronic device's 500, such as replaceable cover 505, may be removed and replaced by a user. In particular, the replaceable cover 505 of the electronic device 500 may be removed from the base 515. A new cover may then be installed. By replacing the replaceable cover 505, custom configurations of tactile cues 510 may be performed. That is, a user may have one replaceable cover 505 for work (e.g., work related tactile cues 510) and another replaceable cover 505 for home (e.g., entertainment tactile cues 510). It should be understood that the replaceable cover 505 or new cover may be fastened together by any technique known in the art to securely enclose the internal workings of an electronic device 500. It should be further understood that the replaceable cover 505 may be made of any suitable material known in the art.

In an embodiment, the electronic device 500 may not include a screen 520, but rather comprise a replaceable cover 505 configured to conform to the dimensions of the base 515. The replaceable cover 505 may be manufactured from injection molding and/or vacuum molded plastic, or other like suitable material having sufficient rigidity. The replaceable cover 505 may be a single unit, thus making it easy to remove, replace, and reuse as the user desires. The replaceable cover 505 may also include stencil or silk screening to identify the numbers and tactile cues 510 or function keys in any language, and thus reduce the cost of having to produce phone or pager units with different languages. The replaceable cover 505 may be stenciled, embossed, or silk screened as desired with any tactile cues 510 or logo. For example, the tactile cues 510 may resemble normal mechanical keys with key graphics. The tactile cues 510 may be concave, convex or flat. Further, the tactile cues 510 may use different materials, e.g. rubber or leather patches on a plastic or a metal cover. In an embodiment, the tactile cues 510 can be flat and coupled to the replaceable cover 505 without indication. Therefore, the tactile cues 510 are distinguished from the replaceable cover 505 by the material or texture of the tactile cues 510. In an example embodiment, the tactile cues 510 may also be dynamic (e.g., tactile cues 510 appear and disappear) using an actuator, such as a mechanical actuator. All figures are illustrative.

Figure 6:
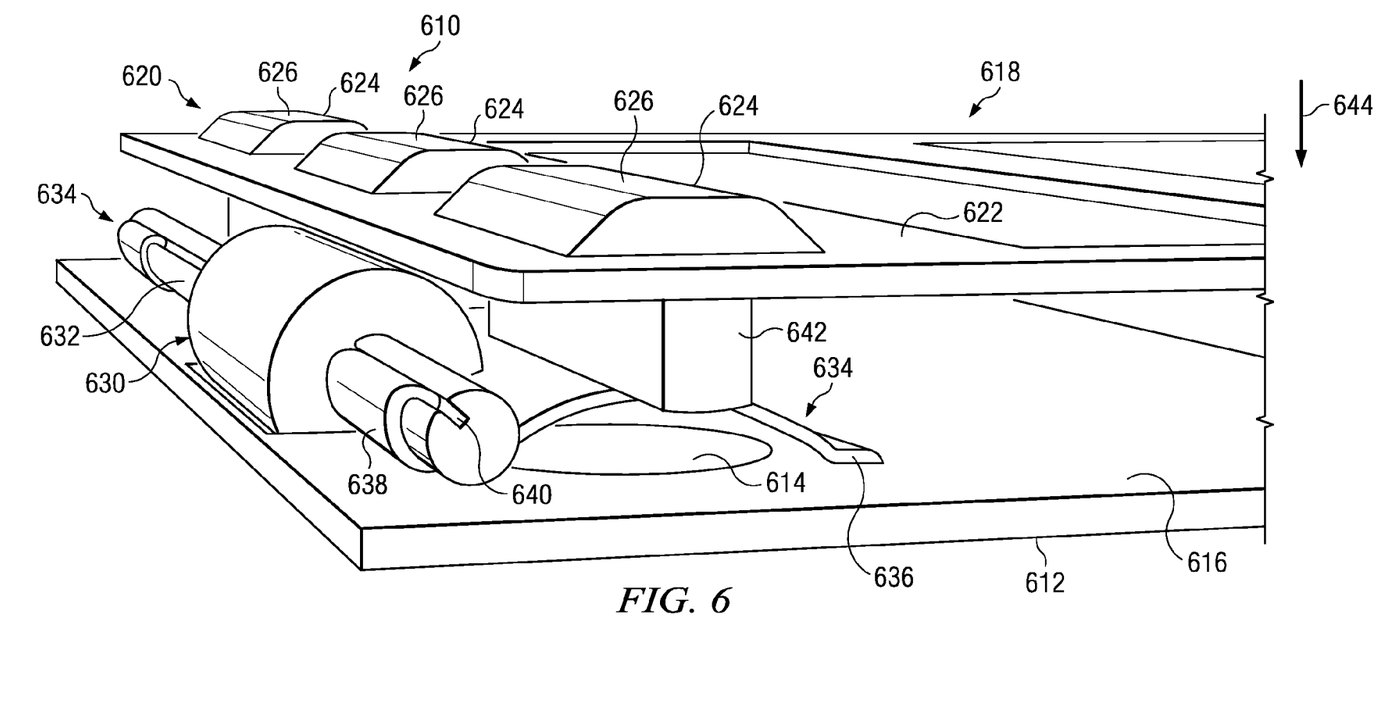
FIG. 6 is a block diagram depicting a mechanical actuator according to an example embodiment of the invention.

FIG. 6 is a block diagram depicting a mechanical actuator according to an example embodiment of the invention. In this embodiment example, an electronic device, such as the electronic devices of FIGS. 1A-5, comprises a circuit board, generally designated at 612, which carries various electrical components, memory devices, controllers, and other associated components to carry out the intended function of the electronic device. For purposes of illustration, the circuit board 612 comprises a dome switch 614 on the surface 616 of the circuit board 612 to complete an electrical circuit path when the dome switch 614 is operated as is well known and understood by those skilled in the art. A user interface or screen/cover generally designated 618 is appropriately located and carried by the electronic device and is made in this example of an elastomer/rigid two-component plastic part wherein the elastomer portion generally designated 620 is deformable and configured to stretch or bulge above the surface 622 such that the surface topology contact area 624 defines keys 626 when the input device 610 is active or in a first operative state, as illustrated in FIG. 6.

In this example embodiment, a mechanical actuator, such as for example a piezoelectric motor generally designated 630 is appropriately mounted to the circuit board 612 and comprises a shaft 632 extending axially lengthwise of the piezoelectric motor 630. A sheet spring steel band generally designated 634 has one end 636 attached to the circuit board 612 and its opposite end 638 suitably attached to the shaft 632 of the piezoelectric motor 630, for example by inserting the end 638 into a complementary shaped and sized slot 640 in the shaft 632. The sheet spring steel band 634 is substantially "C" shaped and is located over the dome switch 614. The sheet spring steel band 634 is in contact with a downward extending foot 642 of the elastomer portion 620 defining the key 624. When the key 624 is pressed or otherwise pushed downward in a direction toward the surface 616 of the circuit board 612, as indicated by the direction arrow 644, the bottom 646 of the foot 642 contacts the sheet spring steel band 634 pushing it into contact with the dome switch 614 to operate the switch 614. When the downward pressure is removed from the key 624, the sheet spring steel band 634 returns to its "C" shaped configuration pushing the foot 642 upward to make the key 624 available.

In a situation in which the key 624 is not available, for example when the electronic device does not have a given function associated with the key 624 available for the particular mode selected, the surface area topology 626 of the key 624 is flush with the surface 622 of the user interface 618 indicating the key is unavailable. The elastomer portion defining the key 624 is permitted to return to its unstretched state when the shaft 632 of the piezoelectric motor 630 rotates in a clockwise direction such that the end 638 of the sheet spring steel band 634 rotates with the shaft 632, thereby shortening the length of the sheet spring steel band 634, causing the band 634 to flatten and approach the surface 616 of the circuit board 612, removing the upward bias on the elastomer foot 642. As shown in the FIG. 6, the shaft 632 may accommodate a number of sheet spring steel bands 634, each of which are associated with a key 624, and the number of keys 624 are determined in accordance with the requirements of the electronic device with which the input device 610 of the present invention is used. In this way, the tactile cues may employ this example embodiment to dynamically generate and disappear from a screen.

It should be understood that a piezoelectric motor which may be utilized example embodiments of the invention is available, for example, from New Scale Technologies, Inc. under the trademark name Squiggle Motor to provide the desired actuation and appearance and disappearance of the keys as described above. The operation of such piezoelectric motors is well understood by those skilled in the art.

Without in any way limiting the scope, interpretation, or application of the claims appearing below, it is possible that a technical effect of one or more of the example embodiments disclosed herein may be a facilitating use of a touchscreen. Another possible technical effect of one or more of the example embodiments disclosed herein may be ease of execution of one or more features.

Embodiments of the present invention may be implemented in software, hardware, application logic or a combination of software, hardware and application logic. The software, application logic and/or hardware may reside on a mobile phone, personal digital assistant or other electronic device. If desired, part of the software, application logic and/or hardware may reside on an electronic device, part of the software, application logic and/or hardware may reside in memory. The application logic, software or an instruction set is preferably maintained on any one of various conventional computer-readable media. In the context of this document, a "computer-readable medium" may be any media or means that may contain, store, communicate, propagate or transport the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes exemplifying embodiments of the invention, these descriptions should not be viewed in a limiting sense. Rather, there are several variations and modifications which may be made without departing from the scope of the present invention as defined in the appended claims. For example features associated with electronic devices may also employ example embodiments of the invention using tactile cues.

What is claimed is:

1. An apparatus, comprising:
at least one processor; and at least one memory including software, where the at least one memory and the software are configured, with the at least one processor, to cause the apparatus to at least:
detect a user actuation of a tactile cue, the tactile cue providing a tactile sensation to the user to facilitate execution of a first feature by indicating to the user through the tactile sensation a starting point for user contact used to identify one or more further user actuations;
identify, with a touch sensitive area, the one or more further user actuations; and
modify a parameter of a second feature associated with the first executed feature in response to the one or more further user actuations, wherein the user actuation is based on the a user contact at the tactile cue, wherein the one or more further actuations are based at least in part on a type of movement of the user contact on the touch sensitive area starting at and moving away from the tactile cue, and wherein the modifying the parameter of the second feature is facilitated based on at least a motion of the type of movement of the user contact on the touch sensitive area starting at and moving away from the tactile cue wherein the tactile cue is located on the apparatus in an area distinct from the touch sensitive area.

2. The apparatus of claim 1 wherein the tactile cue is selectable.

3. The apparatus of claim 1, wherein the user contact comprises a physical pressure at the tactile cue and wherein the type of movement of the user contact comprises the physical pressure starting at and moving away from the tactile cue to an endpoint on the touch sensitive area.

4. The apparatus of claim 1 wherein the tactile cue is concave, convex, or three-dimensional.

5. The apparatus of claim 1 wherein the tactile cue comprises at least one of the following: rubber, leather, plastic, metal, or a combination thereof.

6. The apparatus of claim 1 wherein the tactile cue is an embossed icon.

7. The apparatus of claim 1 further comprising:
the at least one memory including the software is configured, with the at least one processor to cause the apparatus to create, with an actuator, the tactile cue dynamically.

8. The apparatus of claim 7 wherein the actuator is a mechanical actuator or a piezo actuator.

9. The apparatus of claim 8 wherein the at least one memory including the software is configured, with the at least one processor, to cause the apparatus to associate, with the piezo actuator, the user actuation with the first feature.

10. The apparatus of claim 1 wherein the at least one memory including the software is configured, with the at least one processor, to cause the apparatus to lock at least one feature not associated with the tactile cue.

11. The apparatus of claim 1 wherein the at least one memory including the software is configured, with the at least one processor, to cause the apparatus to detect, with the touch sensitive area, at least one of a sweep, a roll, or a gesture.

12. The apparatus of claim 1 wherein the type of movement of the user contact on the touch sensitive area starting at and moving away from the tactile cue comprises multiple sweep motions in sequence.

13. The apparatus of claim 1 wherein the second feature comprises at least one of the following: volume control, graphical user interface menu, or at least one playback feature.

14. A method, comprising:
detecting, with an electronic device, a user actuation of a tactile cue, the tactile cue providing a tactile sensation to the user to facilitate execution of a first feature by indicating to the user through the tactile sensation a starting point for user contact used to identify one or more further user actuations;
identifying the one or more further user actuations; and
modifying a parameter of a second feature associated with the first executed feature in response to the one or more further actuations, wherein the user actuation is based on the user contact at the tactile cue, wherein the one or more further actuations are based at least in part on a type of movement of the user contact on a touch sensitive area of the electronic device starting at and moving away from the tactile cue, and wherein the modifying the parameter of the second feature is facilitated based on at least a motion of the type of movement of the user contact on the touch sensitive area starting at and moving away from the tactile cue wherein the tactile cue is located on the electronic device in an area distinct from the touch sensitive area.

15. The method of claim 14 wherein the tactile cue is selectable.

16. The method of claim 14, wherein the user contact comprises a physical pressure at the tactile cue and wherein the type of movement of the user contact comprises the physical pressure moving starting at and moving away from the tactile cue to an endpoint on the touch sensitive area.

17. The method of claim 14 wherein the tactile cue is concave, convex, or three-dimensional.

18. The method of claim 14 wherein the tactile cue comprises at least one of the following: rubber, leather, plastic, metal, or a combination thereof.

19. The method of claim 14 wherein the tactile cue is an embossed icon.

20. The method of claim further comprising:
creating the tactile cue dynamically.

21. The method of claim 20 wherein the creating the tactile cue dynamically employs a mechanical actuator or piezo actuator.

22. The method of claim 21 further comprising associating the user actuation with the feature using the piezo actuator.

23. The method of claim 14 further comprising: locking at least one feature not associated with the tactile cue.

24. The method of claim 14 wherein identifying a user actuation further comprises:
detecting a sweep, a roll, or a gesture.

25. The method of claim 14 wherein the type of movement of the user contact on the touch sensitive area starting at and moving away from the tactile cue comprises: multiple sweeping motions in sequence.

26. The method of claim 14 wherein the second feature comprises at least one of the following: volume control, graphical user interface menu, or at least one playback feature.

27. A computer-readable memory embodying computer program code, the computer program code executed by a computer to perform operations comprising:
detecting, with an electronic device, a user actuation of a tactile cue, the tactile cue providing a tactile sensation to the user to facilitate execution of a first feature by indicating to the user through the tactile sensation a starting point for user contact used to identify one or more further user actuations;
identifying the one or more further user actuations; and
modifying response to the one or more further actuations, wherein the user actuation is based on the user contact at the tactile cue, wherein the one or more further actuations are based at least in part on a type of movement of the user contact on a touch sensitive area of the electronic device starting at and moving away from the tactile cue, and wherein the modifying the parameter of the second feature is facilitated based on at least a motion of the type of movement of the user contact on the touch sensitive area starting at and moving away from the tactile cue wherein the tactile cue is located on the electronic device in an area distinct from the touch sensitive area.

* * * * *

UNITED STATES PATENT AND TRADEMARK OFFICE
CERTIFICATE OF CORRECTION

| | | |
|---|---|---|
| PATENT NO. | : 8,659,555 B2 | Page 1 of 1 |
| APPLICATION NO. | : 12/145183 | |
| DATED | : June 24, 2008 | |
| INVENTOR(S) | : Pihlaja | |

It is certified that error appears in the above-identified patent and that said Letters Patent is hereby corrected as shown below:

IN THE CLAIMS:

In Claim 1:
Column 10, line 65, "a" should be deleted.

In Claim 27:
Column 12, line 52, after "modifying" insert --a parameter of a second feature associated with the first executed feature in--.

Signed and Sealed this
Twenty-seventh Day of May, 2014

Michelle K. Lee
*Deputy Director of the United States Patent and Trademark Office*